(12) United States Patent
Fu

(10) Patent No.: US 12,707,456 B2
(45) Date of Patent: Aug. 11, 2026

(54) UPLINK TRANSMISSION SENDING METHOD AND APPARATUS, UPLINK TRANSMISSION RECEIVING METHOD AND APPARATUS, COMMUNICATION DEVICE, AND MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 462 days.

(21) Appl. No.: 18/014,146

(22) PCT Filed: Aug. 13, 2020

(86) PCT No.: PCT/CN2020/108950

§ 371 (c)(1),
(2) Date: Dec. 30, 2022

(87) PCT Pub. No.: WO2022/032581

PCT Pub. Date: Feb. 17, 2022

(65) Prior Publication Data

US 2023/0262691 A1 Aug. 17, 2023

(51) Int. Cl.

*H04W 4/00* (2018.01)
*H04W 16/14* (2009.01)
*H04W 72/1268* (2023.01)

(52) U.S. Cl.

CPC ....... *H04W 72/1268* (2013.01); *H04W 16/14* (2013.01)

(58) Field of Classification Search

CPC ............. H04W 72/1268; H04W 16/14; H04W 74/0808; H04W 28/04; H04W 72/04; H04W 72/042; H04W 88/08; H04W 28/08; H04W 28/084; H04W 36/22; H04W 72/12; H04L 5/0007

See application file for complete search history.

(56) References Cited

U.S. PATENT DOCUMENTS 9,794,960 B2 * 10/2017 Ng ........................ H04W 72/23
10,045,376 B2 8/2018 Yang et al.
10,972,937 B2 * 4/2021 Sun ........................ H04W 28/04
12,273,915 B2 * 4/2025 Wu ........................ H04W 16/14
2016/0227425 A1 8/2016 Kim et al.

(Continued)

FOREIGN PATENT DOCUMENTS

CN 105338568 A 2/2016
CN 106063347 A 10/2016

(Continued)

OTHER PUBLICATIONS

International Search Report issued in Application No. PCT/CN2020/108950, dated Apr. 28, 2021, (4p).

(Continued)

*Primary Examiner* — Phuongchau Ba Nguyen

(74) *Attorney, Agent, or Firm* — Arch & Lake LLP; Hao Tan; Shen Wang

(57) ABSTRACT

A method for sending uplink transmission includes: sending, in response to detecting presence of a time interval within a channel occupancy time (COT) of an unlicensed spectrum, a predetermined uplink transmission within the time interval.

12 Claims, 5 Drawing Sheets

(56) References Cited

U.S. PATENT DOCUMENTS

| | | | | |
|---|---|---|---|---|
| 2017/0238342 | A1 | 8/2017 | Yang et al. | |
| 2018/0255586 | A1 | 9/2018 | Einhaus et al. | |
| 2019/0141702 | A1 | 5/2019 | Li et al. | |
| 2019/0335456 | A1* | 10/2019 | Yerramalli | H04W 74/0808 |
| 2020/0037354 | A1 | 1/2020 | Li et al. | |
| 2020/0052865 | A1 | 2/2020 | Liou et al. | |
| 2020/0228991 | A1 | 7/2020 | Jiang et al. | |
| 2020/0305191 | A1* | 9/2020 | Moon | H04W 72/23 |
| 2020/0314901 | A1* | 10/2020 | Bhattad | H04W 72/12 |
| 2020/0359411 | A1* | 11/2020 | Li | H04W 16/14 |
| 2021/0007128 | A1* | 1/2021 | Bhattad | H04W 16/14 |
| 2021/0235491 | A1* | 7/2021 | Iyer | H04W 74/002 |
| 2021/0259014 | A1* | 8/2021 | Falahati | H04W 72/1268 |
| 2022/0287096 | A1* | 9/2022 | Talarico | H04W 74/004 |
| 2023/0180293 | A1* | 6/2023 | Calcev | H04W 74/08 370/328 |
| 2023/0189328 | A1* | 6/2023 | Xu | H04W 72/569 370/329 |
| 2023/0300809 | A1* | 9/2023 | Kusashima | H04W 74/02 370/336 |
| 2023/0363002 | A1* | 11/2023 | Liang | H04W 74/0825 |
| 2023/0389071 | A1* | 11/2023 | Li | H04W 74/0808 |

FOREIGN PATENT DOCUMENTS

| | | | |
|---|---|---|---|
| CN | 106851839 | A | 6/2017 |
| CN | 107615870 | A | 1/2018 |
| CN | 109155710 | A | 1/2019 |
| CN | 109156035 | A | 1/2019 |
| CN | 110831201 | A | 2/2020 |
| CN | 111183703 | A | 5/2020 |
| WO | 2019056370 | A1 | 3/2019 |
| WO | 2020150957 | A1 | 7/2020 |

OTHER PUBLICATIONS

CNOA issued in Application No. 202080001903.5 dated Jan. 9, 2025 with English translation, (15p).

CNOA issued in Application No. 202080001903.5 dated Jun. 2, 2025 with English translation, (10p).

Intel Corporation, "Uplink grant free transmission for URLLC services", 3GPP TSG RAN1 Wg Meeting #88, R1-1702242, Athens, Greece Feb. 13-17, 2017, (7p).

Huawei et al., "Discussion on additional opportunities for Msg3 transmission in NR-U", 3GPP TSG-RAN WG2 Meeting 107, R2-1911183, Prague, Czech Republic, Aug. 26-30, 2019, (3p).

Qualcomm Incorporated, "DL signals and channels for NR-U", 3GPP TSG RAN WG1 Meeting #96b, R1-1904997, Xi'an, China, Apr. 8-Apr. 12, 2019, (10p).

* cited by examiner

UPLINK TRANSMISSION SENDING METHOD AND APPARATUS, UPLINK TRANSMISSION RECEIVING METHOD AND APPARATUS, COMMUNICATION DEVICE, AND MEDIUM

CROSS REFERENCE TO RELATED APPLICATION

This application is a National Stage of International Application No. PCT/CN2020/108950, filed on Aug. 13, 2020, the entire disclosure of which is incorporated by reference herein for all purposes.

BACKGROUND

On the unlicensed spectrum, before occupying a channel to send data, a transmitter generally needs to monitor the channel, that is, to perform clear channel assessment (CCA). If the transmitter determines that the channel is idle after performing the CCA, it can occupy the channel to send data; otherwise, the channel cannot be occupied. The above process is generally referred to as a process of channel access on the unlicensed frequency band. If an idle channel is detected, the idle channel will be occupied, and the duration of one occupation of the idle channel is a channel occupancy time (COT).

SUMMARY

This disclosure relates to, but is not limited to, the field of wireless communication technologies, and in particular, to a method and an apparatus for sending uplink transmission based on unlicensed spectrum, a method and an apparatus for receiving uplink transmission based on unlicensed spectrum, a communication device and medium.

Embodiments of this disclosure provide a method and an apparatus for sending uplink transmission based on unlicensed spectrum, a method and an apparatus for receiving uplink transmission based on unlicensed spectrum, a communication device and medium.

A first aspect of some embodiments of this disclosure provides a method for sending uplink transmission, including:

sending, in response to detecting presence of a time interval within a COT of an unlicensed spectrum, a predetermined uplink transmission within the time interval.

A second aspect of some embodiments of this disclosure provides a method for receiving uplink transmission, including:

receiving, in response to detecting presence of a time interval within a COT of an unlicensed spectrum, a predetermined uplink transmission within the time interval.

A third aspect of the embodiments of this disclosure provides a communication device, including a processor, a transceiver, a memory, and an executable program stored on the memory and executable by the processor, where the processor is configured to, when executing the executable program, implement the method according to any technical solution of the first aspect or the second aspect.

A fourth aspect of the embodiments of this disclosure provides a computer storage medium storing an executable program, where the executable program is used for, when being executed by a processor, implementing the method according to any technical solution of the first aspect or the second aspect.

It is to be understood that the foregoing general description and the following detailed description are exemplary and explanatory only without limiting the disclosed embodiments.

BRIEF DESCRIPTION OF THE DRAWINGS

The accompanying drawings, which are incorporated in and constitute a part of this specification, illustrate embodiments consistent with the invention and together with the description serve to explain the principles of the embodiments of the invention.

DETAILED DESCRIPTION

Exemplary embodiments will be described in detail herein, examples of which are illustrated in the accompanying drawings. Where the following description refers to the drawings, the same numerals in different drawings refer to the same or similar elements unless otherwise indicated. The implementations described in the following exemplary embodiments do not represent all implementations consistent with embodiments of the invention. Instead, they are merely examples of apparatuses and methods consistent with some aspects of embodiments of the invention as recited in the appended claims.

The terms used in the embodiments of this disclosure are only for the purpose of describing particular embodiments, and are not intended to limit the embodiments of this disclosure. As used in the embodiments of this disclosure and the appended claims, the singular forms “a”, “and” and “the” are intended to include the plural forms as well, unless the context clearly dictates otherwise. It will also be understood that the term “and/or” as used herein refers to and includes any and all possible combinations of one or more of the associated items as listed.

It should be understood that although the terms first, second, third, and the like may be used in embodiments of this disclosure to describe various pieces of information, such information should not be limited to these terms. These terms are only used to distinguish the same type of information from each other. For example, without departing from the scope of the embodiments of this disclosure, the first information may also be referred to as the second information, and similarly, the second information may also be referred to as the first information. Depending on the context, the word "if" as used herein can be interpreted as "at the time of" or "when" or "in response to determining."

Figure 1:
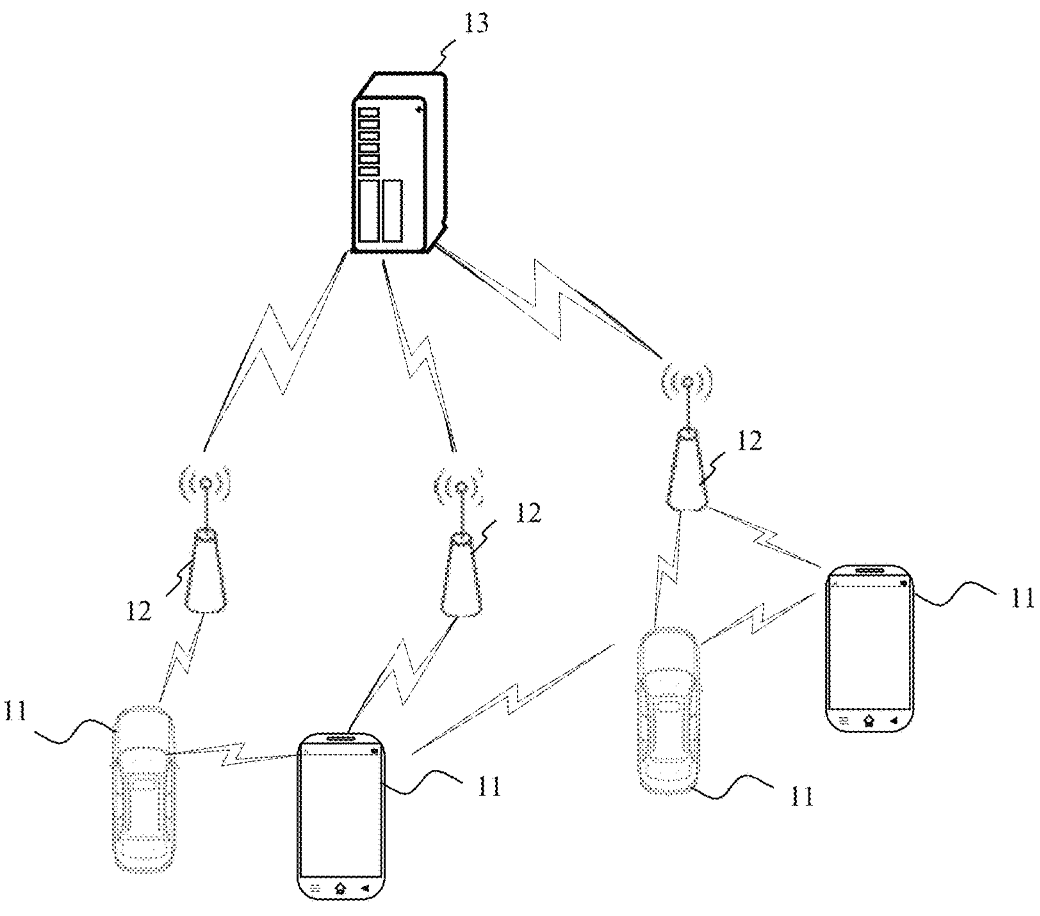
FIG. 1 is a block diagram of a wireless communication system according to some embodiments.

Referring to FIG. 1, which shows a block diagram of a wireless communication system according to some embodiments of this disclosure. As shown in FIG. 1, the wireless communication system is a communication system based on cellular mobile communication technology, and the wireless communication system may include several UEs 11 and several base stations 12.

UE 11 may be a device that provides voice and/or data connectivity to the user. UE 11 may communicate with one or more core networks via radio access network (RAN), and UE 11 may be an IoT UE, such as a sensor device, a mobile phone (or "cellular" phone) and a computer provided with an IoT UE. For example, it may be a stationary, portable, pocket-sized, hand-held, computer-built-in, or vehicle-mounted device. For example, it may be a station (STA), a subscriber unit, a subscriber station, a mobile station, a mobile site, a remote station, an access point, a remote terminal, an access terminal, a user terminal, a user agent, a user device, or user equipment (UE). Alternatively, UE 11 may also be a device of an unmanned aerial vehicle. Alternatively, UE 11 may also be an in-vehicle device, for example, an electronic control unit (ECU) with the wireless communication function, or a wireless communication device externally connected to the ECU. Alternatively, UE 11 may also be a roadside device, for example, a streetlight, a signal light, or other roadside device having the wireless communication function.

The base station 12 may be a network side device in a wireless communication system. Herein, the wireless communication system may be the 4th generation mobile communication (4G) system, also known as the long term evolution (LTE) system. Alternatively, the wireless communication system may also be a 5G system, also known as new radio (NR) system or 5G NR system. Alternatively, the wireless communication system may also be a next-generation system of the 5G system. Herein, the access network in the 5G system may be called new generation-radio access network (NG-RAN) or a the MTC system.

The base station 12 may be an evolved NodeB (eNB) used in the 4G system. Alternatively, the base station 12 may also be a gNB that adopts a centralized-distributed architecture in the 5G system. When the base station 12 adopts the centralized-distributed architecture, it usually includes a central unit (CU) and at least two distributed units (DUs). The central unit is provided with a protocol stack of a packet data convergence protocol (PDCP) layer, a radio link control (RLC) protocol layer, and a media access control (MAC) layer; while the distribution unit is provided with a physical (PHY) layer protocol stack. The specific implementation manner of the base station 12 is not limited in embodiments of this disclosure.

Wireless connection may be established between the base station 12 and the UE 11 through a wireless air interface. In different embodiments, the wireless air interface may be a wireless air interface based on the 4G standard; or, the wireless air interface may be a wireless air interface based on the 5G standard, for example, a new air interface; alternatively, the wireless air interface may also be a wireless air interface based on a standard of 5G-based next-generation mobile communication network technology.

In some embodiments, an E2E (end to end) connection may also be established between UEs 11, for example, in scenarios of V2V (vehicle to vehicle) communication, V2I (vehicle to infrastructure) communication and V2P (vehicle to pedestrian) communication of the V2X (vehicle to everything) communication.

In some embodiments, the above wireless communication system may further include a network management device 13.

Several base stations 12 are respectively connected to the network management device 13. Herein, the network management device 13 may be a core network device in the wireless communication system. For example, the network management device 13 may be a mobility management entity (MME) in an evolved packet core (EPC) network. Alternatively, the network management device may also be other core network devices, such as a serving gateway (SGW), a public data network gateway (PGW), a policy and charging rules function (PCRF), a home subscriber server (HSS), or the like. The implementation manner of the network management device 13 is not limited in embodiments of this disclosure. A frame based equipment (FBE) is a device that implements a specific channel access mode. In this mode, the transmitter performs channel sensing at a fixed frame period (FFP), and can start data transmission after detecting an idle channel by performing CCA on only one observation slot. Each FFP may include a fixed idle duration at the end. The remaining part except for the idle duration and the observation slot of CCA is the maximum channel occupancy time (COT) available for the transmitter in one continuous transmission. R17 URLLC/IIoT project is directed to study the related issues of the terminal, serving as an initiating FBE, occupying the channel (UE initiated COT for FBE). Even if the UE acts as the initiating FBE occupying the channel, the uplink channel of the UE may still need to be pre-configured or dynamically scheduled by the base station, so as to ensure that the base station can accurately receive uplink information by predicting the resource location and modulation mode used for uplink transmission. In COT, the terminal may perform the uplink transmission on a configured grant-physical uplink shared channel (CG-PUSCH), a dynamic scheduled-physical uplink shared channel (DS-PUSCH), a typical PUCCH, and the like.

If the terminal is in FBE mode, after the UE's CCA succeeds, information transmission may be started at the start of FFP, otherwise it may be considered that the channel has not been successfully occupied. In the process of occupying the channel, if the UE suspends the uplink transmission for more than a period of time after sending a piece of uplink information, but the UE still has uplink data to send subsequently and the COT has not been exceeded, then the UE can perform another CCA. If it is still detected that the channel is idle, the channel may continue to be occupied until the COT ends. However, it is possible to detect that the channel is busy, then the terminal cannot continue to occupy the channel for transmission. In this way, the transmission delay may be increased for some uplink channels.

Figure 2:
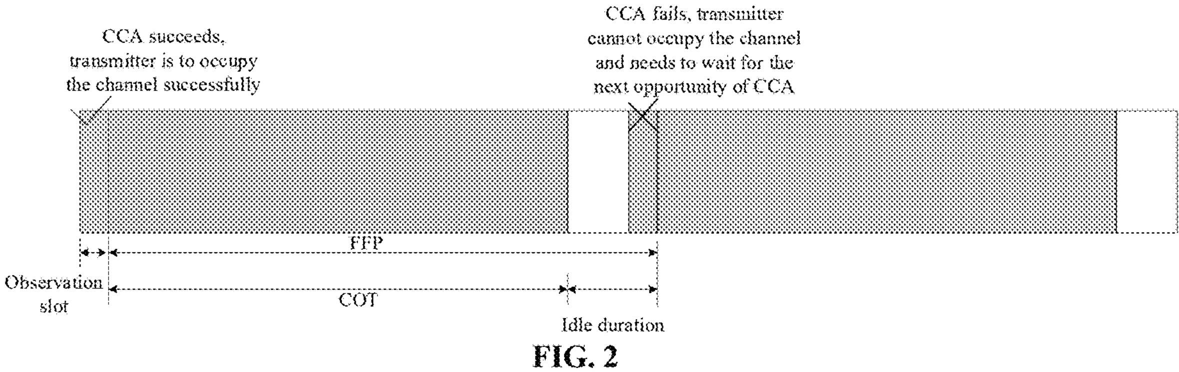
FIG. 2 is a schematic diagram illustrating the effect of a time interval according to some embodiments.

As shown in FIG. 2, CCA is performed in the observation slot. If the CCA succeeds, that is, an idle channel on the unlicensed spectrum is detected, the idle channel is occupied. The time duration for occupying the idle channel is one COT. Before the next CCA, there is an idle duration, and a FFP includes the COT and the idle duration.

Figure 3:
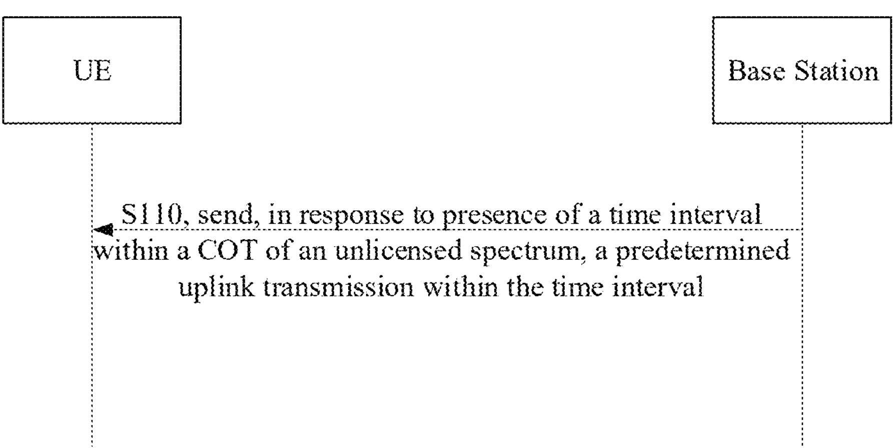
FIG. 3 is a schematic flowchart of a time-interval-based sending method according to some embodiments.

As shown in FIG. 3, some embodiments of this disclosure provide a method for sending uplink transmission, including a following step.

In S110, in response to detecting presence of a time interval within a COT of an unlicensed spectrum, a predetermined uplink transmission is sent within the time interval.

This method may be applied to the UE.

The UE may be various types of UEs. The type of the UE includes, but is not limited to, a human-mounted terminal such as a mobile phone or a wearable device, and may also be a vehicle-mounted terminal or an IoT terminal. Typical IoT terminals may include various types of sensors or electrical devices. The sensors include industrial touch sensors, home environment sensors or road monitoring sensors. The electrical devices include smart home equipment and/or smart office equipment.

In the COT occupied by the UE on the unlicensed spectrum, if it is determined that there is a time interval in the COT according to the configuration information of the pre-configured uplink channel and/or the scheduling information of the dynamically scheduled uplink channel, the UE may send the predetermined uplink transmission in the time interval, thereby reducing the possibility of the occupied COT being preempted by other devices. The time interval may be considered as a time duration when no transport channel is configured in the COT, for example, a time duration when no uplink channel is configured.

The predetermined uplink transmission includes, but is not limited to, uplink data and/or uplink signaling.

By sending the predetermined uplink transmission in the time interval within the COT occupied by the UE, the probability of other devices preempting the channel occupied by the UE is reduced, thereby avoiding the phenomenon of large uplink transmission delay caused by such preemption, and improving the transmission rate of uplink transmission on the uplink channel.

In some embodiments, sending the predetermined uplink transmission in the time interval may include:

send the predetermined uplink transmission for the entire time interval; or sending the predetermined uplink transmission in a partial duration of the time interval, as long as the transmission of the predetermined uplink transmission in this partial duration can prevent other devices from preempting the channel.

For example, in order to facilitate a differentiation operation at the base station side, a blank period may be reserved at the end of the time interval, and the blank period may be a period when no uplink transmission is performed. In this way, during reception of the base station side, decoding at the base station side can be facilitated based on the silence period (i.e., the blank period) of reception through suspension of the uplink transmission in the blank period. The duration of the blank period is less than a preset duration, and the preset duration may be a minimum duration for which the channel can be preempted by other devices, for example, 16 us or the like.

In some embodiments, S110 may include: sending, in response to an interval duration of the time interval within the COT of the unlicensed spectrum satisfying a first condition, the predetermined uplink transmission within the time interval.

The predetermined uplink transmission may be sent only when the interval duration of the time interval satisfies a certain condition. Otherwise, the predetermined uplink transmission may not be sent. On the one hand, unnecessary transmission can be avoided when the interval duration is very short. On the other hand, the waste of resources caused by continuous occupancy of the channel can be reduced when the interval duration is very long.

For example, in some embodiments, the interval duration satisfying the first condition may include: the interval duration of the time interval exceeds a preset duration.

For example, the preset duration may be 16 us, which is not limited thereto. Since the time interval is relatively short, the possibility of the channel being preempted by other devices is small or the channel cannot be preempted by other devices, so the predetermined uplink transmission may not be sent during the time interval.

In this way, the predetermined uplink transmission does not need to be sent in a small time interval, thereby reducing unnecessary uplink transmission and reducing the transmission complexity of the UE.

In some other embodiments, the interval duration satisfying the first condition includes:

the interval duration of the time interval is less than a threshold value.

Herein, the threshold value is a fixed value; or, the threshold value is associated with at least one of a duration of the FFP of the unlicensed spectrum or a duration of the COT.

The threshold value may be the upper limit value of the interval duration satisfying the first condition, and the aforementioned preset duration may be the lower limit value of the interval duration satisfying the first condition.

The threshold value may be a preset fixed value, or a preset static value. The preset value may be any specific value between 1-5 ms, for example, the specific value is 2 ms or 3 ms.

In addition, the threshold value may also be a dynamic value.

For example, the threshold value depends on the duration of the current FFP and/or COT.

In some embodiments, the threshold value is positively related to the duration of the FFP and/or COT, that is, the longer the FFP and/or the COT, the larger the threshold value may be.

For example, the threshold value may be a preset percentage of the FFP where the current COT is located, and the preset percentage may be 50%, 60%, 30%, or 70%.

For example, the threshold value may be equal to the COT minus a specific value, and the specific value may be preset milliseconds, such as 1 ms, 2 ms, or 4 ms. The value range of the specific value may be less than or equal to 50% of the COT duration.

To sum up, by satisfying the first condition of the interval duration, unnecessary transmission and resource occupation waste caused by sending the predetermined uplink transmission in the time intervals of any interval duration can be reduced.

In some embodiments, the S110 may include:

sending, in response to presence of the time interval within the COT of the unlicensed spectrum and at least one uplink channel within the COT after the time interval satisfying a second condition, the predetermined uplink transmission within the time interval.

To send the predetermined uplink transmission in the corresponding time interval, the interval duration of the time interval may only need to satisfy the first condition. Additionally, the uplink channel configured in the COT may also need to satisfy a certain condition, for example, the second condition. Alternatively, in some other embodiments, regardless of whether the interval duration of the time interval satisfies the first condition, only the uplink channel in the COT needs to satisfy the second condition.

In some embodiments, the uplink channel satisfying the second condition includes but is not limited to:

at least one uplink channel is configured in the COT after the time interval, so it may be necessary to wait for the time interval to perform uplink transmission. Otherwise, the channel occupied by the UE can be released.

In some other embodiments, the uplink channel satisfying the second condition includes:

a time-domain ending position of the uplink channel is located within the COT; and/or, a priority of the uplink channel after the time interval reaches a preset priority.

Exemplarily, the time-domain ending position (i.e., the termination position in the time domain) of one or more uplink channels after the time interval needs to be located within the COT, for example, may be located before or at the same time as an ending time of the COT. If it is located outside the COT, even the COT continues to be occupied, sending of the whole uplink transmission on the uplink channel cannot be completed within the COT. Accordingly, the predetermined uplink transmission is no longer sent in this time interval, and the COT is released as soon as possible, thereby reducing the interference caused by invalid uplink transmission to other surrounding nodes.

In other cases, the priority of one or more uplink channels to be sent in the COT needs to be considered. Generally, the higher the priority, the more urgent the uplink transmission sent on the uplink channel is, and the more sensitive the time delay is. Accordingly, it is necessary to complete the uplink transmission on the corresponding uplink channel within the current COT as much as possible.

In some embodiments, uplink channels may be divided into multiple priorities, and the preset priority may include one or more higher priorities therein.

For example, priorities of the uplink channels may be divided into a first priority and a second priority, the first priority is higher than the second priority, and the priority that satisfies the second condition may be the first priority.

The priority of the uplink channel for the enhanced mobile broadband (eMBB) service may be lower than the priority of the uplink channel for the ultra-reliable and low latency communication (URLLC) service. At this time, if the uplink channel located after the time interval in the current COT occupied by the UE includes the uplink channel used for URLLC service transmission, it may be considered that the uplink channel in the current COT satisfies the second condition; and if the uplink channel located after the time interval in the current COT occupied by the UE includes only the uplink channel used for eMBB service transmission, it may be considered that the second condition is not satisfied. The above description is only an example, and the specific implementation is not limited thereto.

In some embodiments, when the priority of the uplink channel after the time interval in the COT does not reach the preset priority, it may be considered that the transmission urgency of the data to be transmitted on the uplink channel is not high, and there is no need to continuously occupy the COT by filling the time interval with the predetermined uplink transmission, thereby reducing unnecessary predetermined uplink transmission.

In some embodiments, the time interval includes at least one of the following:

a time interval between a time-domain starting position of a FFP where the COT is located and a time-domain starting position of a first one uplink channel within the COT; or a time interval between time-domain resources of any two adjacent uplink channels within the COT.

If a COT is configured with time-domain resources of multiple uplink channels, the time interval in the COT may further include: time intervals between time-domain resources of different uplink channels.

Figure 4:
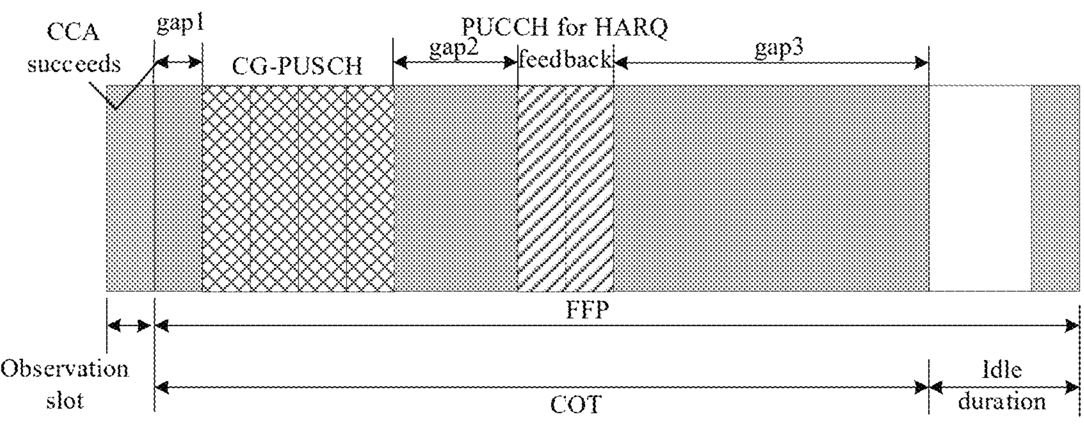
FIG. 4 is a schematic diagram illustrating the effect of a time interval according to some embodiments.

Referring to FIG. 4, gap1 is the time interval between the time-domain starting position of the FFP and the first uplink channel in the COT; gap2 and gap3 are time intervals between time-domain resources of two uplink channels.

Both of these two types of time intervals are time intervals during which the predetermined uplink transmission can be performed. In some embodiments, sending the predetermined uplink transmission within the time interval includes at least one of the following:

sending a pilot signal within the time interval;

sending repeatedly within the time interval, in response to an uplink channel being configured within the COT before the time interval, the uplink transmission on the uplink channel configured before the time interval; or sending within the time interval the uplink transmission on an uplink channel after the time interval.

If the predetermined uplink transmission is a pilot signal, the transmission of the pilot signal may be used for realizing the function corresponding to the pilot signal. For example, if the pilot signal is a channel-state information reference signal (CSI-RS), the transmission of the pilot signal may be used for channel measurement and/or estimation.

If the pilot signal is a synchronization signal, the transmission of the pilot signal may be used for synchronization and/or synchronization calibration between the base station and the UE.

If the pilot signal is a demodulation reference signal, the transmission of the pilot signal may be used for improving the demodulation performance of uplink transmission.

In some embodiments, any information may be transmitted in the time interval, and the base station side may directly discard the information that is transmitted at will without a specific purpose. However, the UE's continuous occupation of the COT can be maintained through the randomly transmitted information without a specific purpose. Information with no specific purpose may also be a preset padding sequence. The padding sequence may be composed of all "0" bits or all "1" bits, or a mixed sequence composed of "1" and "0".

In some embodiments of this disclosure, the transmitted pilot signal or the uplink transmission on the uplink channel in the COT has a specific purpose, so the resource utilization efficiency of the time interval is further improved.

For example, if one or more uplink channels are configured in the COT before the time interval, the uplink transmission of these uplink channels may be repeatedly sent in the time interval, thereby increasing the time gain of the base station and thus improving the success rate of decoding.

For another example, if there are one or more uplink channels in the COT after the time interval, the uplink transmission of the uplink channels configured after the time interval may be sent in the time interval, thereby increasing the time gain of the base station and thus improving the success rate of decoding.

Specifically, the uplink transmission of the first one uplink channel or the uplink transmission of the last one uplink channel in the COT may be sent within the time interval.

The predetermined uplink transmission sent in the time interval may be uplink transmission on the uplink control channel or uplink transmission on the uplink data channel.

Figure 5:
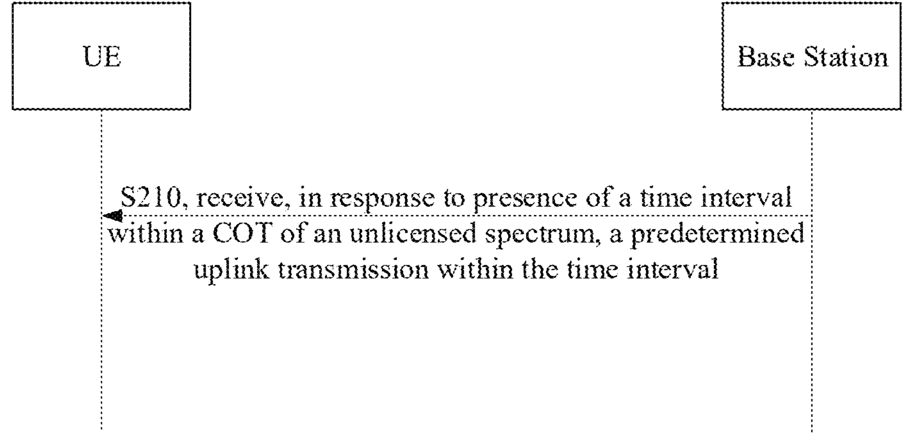
FIG. 5 is a schematic flowchart of a time-interval-based sending method according to some embodiments.

As shown in FIG. 5, some embodiments of this disclosure provides a method for receiving uplink transmission, including a following step.

In S210, in response to detecting presence of a time interval within a COT of an unlicensed spectrum, a predetermined uplink transmission is received within the time interval.

The method for receiving uplink transmission may be applied to the base station.

Since the uplink channel may be configured by the base station, the base station will know whether there is a time interval in the COT occupied by the UE.

Accordingly, the base station may determine presence of the time interval according to its own configuration information and/or scheduling instruction for the UE's uplink channel, and receive the predetermined uplink transmission sent by the UE in the determined time interval.

In some embodiments, the S210 includes:

receiving, in response to an interval duration of the time interval within the COT of the unlicensed spectrum satisfying a first condition, the predetermined uplink transmission within the time interval.

Only when the time interval satisfies the first condition, the predetermined uplink transmission needs to be received in the time interval. Otherwise, the receiving may not be required to reduce unnecessary receiving and/or decoding.

In some other embodiments, the interval duration satisfying the first condition includes at least one of the following:

the interval duration of the time interval is less than a threshold value; where the threshold value is a fixed value, or, the threshold value is associated with at least one of a duration of the FFP of the unlicensed spectrum or a duration of the COT.

For the manner of determining the threshold value here, reference may be made to the foregoing embodiments, which will not be repeated here.

In some other embodiments, the S210 may include:

receiving, in response to presence of the time interval within the COT of the unlicensed spectrum and at least one uplink channel within the COT after the time interval satisfying a second condition, the predetermined uplink transmission within the time interval.

Only when the uplink channel configured in the COT also needs to satisfy the second condition, will the predetermined uplink transmission be received in the time interval within the COT. For example, the uplink channel satisfying the second condition includes:

a time-domain ending position of the uplink channel is located within the COT; and/or, a priority of the uplink channel after the time interval reaches a preset priority.

In some other embodiments, the time interval includes at least one of the following:

a time interval between a time-domain starting position of a FFP where the COT is located and a time-domain starting position of a first one uplink channel within the COT; or a time interval between time-domain resources of any two adjacent uplink channels within the COT.

There may be one or more time intervals in a COT. If some time intervals satisfy the first condition, it may be necessary to receive the predetermined uplink transmission; while some other time intervals do not satisfy the first condition, and then the predetermined uplink transmission may not be received.

In some other embodiments, sending the predetermined uplink transmission within the time interval includes at least one of the following:

receiving a pilot signal within the time interval;

receiving within the time interval, in response to an uplink channel being configured within the COT before the time interval, the uplink transmission on the uplink channel configured before the time interval; or receiving within the time interval the uplink transmission on an uplink channel after the time interval.

By receiving the pilot signal, it is possible to measure and/or estimate the channel condition of the uplink channel, or to perform synchronization or synchronization calibration.

If the predetermined uplink transmission is the uplink transmission of one or more uplink channels in the COT, upon receiving it at the base station, the time-domain gain can be improved, thereby improving the success rates of decoding and receiving of the base station.

Figure 7:
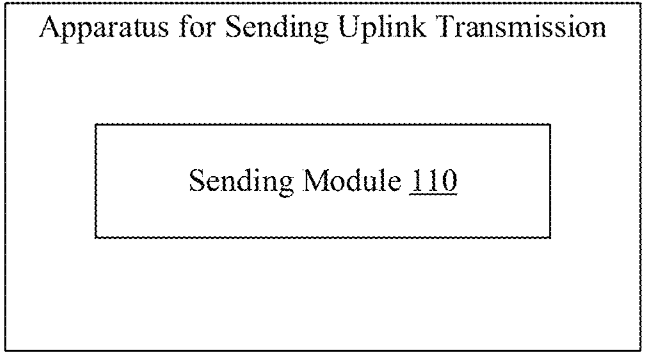
FIG. 7 is a block diagram of an apparatus for sending uplink transmission according to some embodiments.

As shown in FIG. 7, some embodiments of this disclosure provides an apparatus for sending uplink transmission, including a sending module.

The sending module 110 is configured to send, in response to detecting presence of a time interval within a COT of an unlicensed spectrum, a predetermined uplink transmission within the time interval.

In some embodiments, the sending module 110 may be a program module. After the program module is executed by a processor, the predetermined uplink transmission may be sent.

In some other embodiments, the sending module 110 may be a soft-hard combination module. The soft-hard combination module includes but is not limited to various programmable arrays, which may include, but is not limited to, a field programmable array or a complex programmable array.

In still other embodiments, the sending module 110 may further include a pure hardware module, which includes, but is not limited to, an application specific integrated circuit.

In some embodiments, the sending module 110 is configured to send, in response to an interval duration of the time interval within the COT of the unlicensed spectrum satisfying a first condition, the predetermined uplink transmission within the time interval.

In some embodiments, the interval duration satisfying the first condition includes:

the interval duration of the time interval is less than a threshold value;

where the threshold value is a fixed value, or, the threshold value is associated with at least one of a duration of the FFP of the unlicensed spectrum or a duration of the COT.

In some embodiments, the sending module 110 is configured to send, in response to presence of the time interval within the COT of the unlicensed spectrum and at least one uplink channel within the COT after the time interval satisfying a second condition, the predetermined uplink transmission within the time interval.

In some embodiments, the uplink channel satisfying the second condition includes:

a time-domain ending position of the uplink channel is located within the COT; and/or, a priority of the uplink channel after the time interval reaches a preset priority.

In some embodiments, the time interval includes at least one of the following:

a time interval between a time-domain starting position of a FFP where the COT is located and a time-domain starting position of a first one uplink channel within the COT; or a time interval between time-domain resources of any two adjacent uplink channels within the COT.

In some embodiments, the sending module 110 is specifically configured to perform at least one of the following:

sending a pilot signal within the time interval;

sending repeatedly within the time interval, in response to an uplink channel being configured within the COT before the time interval, the uplink transmission on the uplink channel configured before the time interval; or sending within the time interval the uplink transmission on an uplink channel after the time interval.

Figure 8:
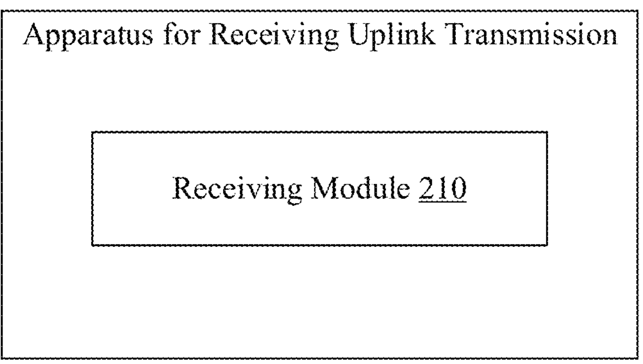
FIG. 8 is a block diagram of an apparatus for receiving uplink transmission according to some embodiments.

As shown in FIG. 8, some embodiments of this disclosure provide an apparatus for receiving uplink transmission, including a receiving module.

The receiving module 210 is configured to receive, in response to detecting presence of a time interval within a COT of an unlicensed spectrum, a predetermined uplink transmission within the time interval.

In some embodiments, the receiving module 210 may be a program module. After the program module is executed by a processor, the predetermined uplink transmission may be received.

In some other embodiments, the receiving module 210 may be a soft-hard combination module. The soft-hard combination module includes but is not limited to various programmable arrays, which may include, but is not limited to, a field programmable array or a complex programmable array.

In still other embodiments, the receiving module 210 may further include a pure hardware module, which includes, but is not limited to, an application specific integrated circuit.

In some embodiments, the receiving module 210 is configured to receive, in response to an interval duration of the time interval within the COT of the unlicensed spectrum satisfying a first condition, the predetermined uplink transmission within the time interval.

In some embodiments, the interval duration satisfying the first condition includes at least one of the following:

the interval duration of the time interval is less than a threshold value; wherein, the threshold value is a fixed value, or, the threshold value is associated with at least one of a duration of the FFP of the unlicensed spectrum or a duration of the COT.

In some embodiments, the receiving module 210 is configured to receive, in response to presence of the time interval within the COT of the unlicensed spectrum and at least one uplink channel within the COT after the time interval satisfying a second condition, the predetermined uplink transmission within the time interval.

In some embodiments, the uplink channel satisfying the second condition includes:

a time-domain ending position of the uplink channel is located within the COT; and/or, a priority of the uplink channel reaches a preset priority.

In some embodiments, the time interval includes at least one of the following:

a time interval between a time-domain starting position of a FFP where the COT is located and a time-domain starting position of a first one uplink channel within the COT; or a time interval between time-domain resources of any two adjacent uplink channels within the COT.

In some embodiments, the receiving module 210 is at least configured to perform at least one of the following:

receiving a pilot signal within the time interval;

receiving within the time interval, in response to an uplink channel being configured within the COT before the time interval, the uplink transmission on the uplink channel configured before the time interval; or receiving within the time interval the uplink transmission on an uplink channel after the time interval.

This disclosure proposes a method for sending uplink information when the terminal acts as an initiating FBE and occupies a channel on the unlicensed spectrum. The method can ensure that the FBE terminal continuously occupies the channel for uplink transmission, and can improve the demodulation performance of uplink data.

Some bits or information may be used to fill in the time interval (gap) shown in FIG. 2 to ensure that the terminal can continuously occupy the channel for uplink transmission.

The technical solutions according to an example may be as follows.

If certain conditions are met, the terminal may fill some uplink bits/information in the gap to ensure continuous uplink transmission. The conditions may be as follows.

The interval duration of the time interval is less than a certain threshold value, and the threshold value may be a fixed value; or a value related to the FFP duration or the maximum allowable COT. A few specific examples of this threshold are given as follows.

In example 1, the threshold value may be fixedly set to 2 ms.

In example 2, the threshold value may be set to 60% of the FFP duration.

In example 3, the threshold value may be set as being equal to "the maximum COT duration—1 ms".

The time-domain ending position of the uplink channel to be sent after the time interval does not exceed the maximum allowable COT. In other words, the uplink channel after the time interval may also need to meet certain conditions, which is one of the aforementioned second conditions.

Figure 6:
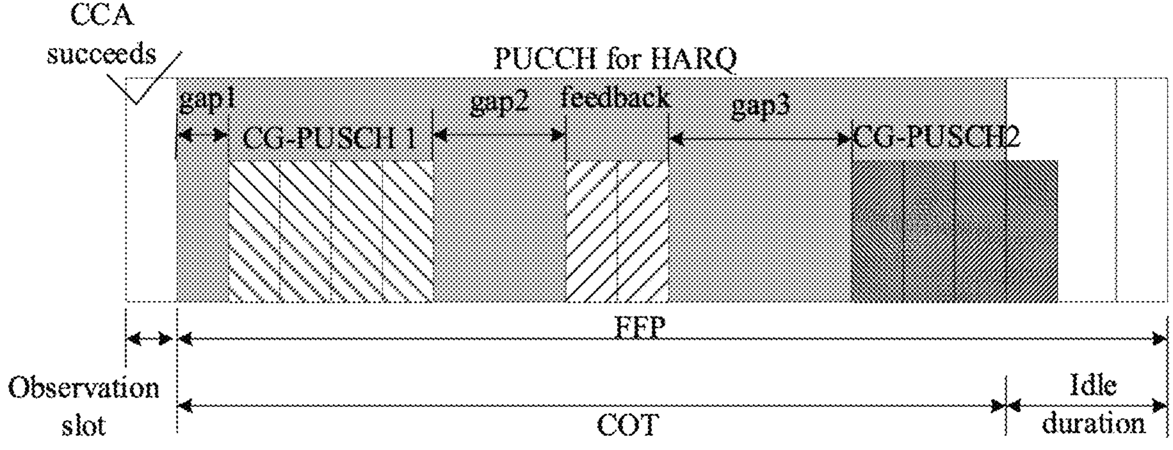
FIG. 6 is a schematic diagram illustrating the effect of a time interval according to some embodiments.

The uplink channel after gap1 in FIG. 6 is CG-PUSCH 1, which occupies 4 symbols. The terminal determines that the ending position of the CG-PUSCH 1 is still within the COT, so the CG-PUSCH 1 satisfies the condition.

The uplink channel after gap 2 in FIG. 6 is the PUCCH of HARQ feedback, which occupies 2 symbols. The terminal determines that the ending position of the PUCCH of HARQ feedback is still within the COT, so the PUCCH of HARQ feedback satisfies the condition.

The uplink channel after gap3 in FIG. 6 is CG-PUSCH 2, which occupies 4 symbols. The terminal determines that the ending position of CG-PUSCH 2 exceeds the COT, so CG-PUSCH 2 does not meet the condition.

In some embodiments, if at least one uplink channel in the COT after the time interval satisfies the second condition, the predetermined uplink transmission is sent within the time interval.

In some other embodiments, if all uplink channels included in the COT after the time interval satisfy the second condition, the predetermined uplink transmission is sent within the time interval.

The priority of the uplink channel to be sent after the time interval is high priority.

For example, if the priority of the uplink channel to be sent after the gap is high priority, the condition is satisfied. If it is not high priority, the condition is not met. The uplink channel on which the uplink transmission is to be sent may include at least one of the following:

CG-PUSCH, where the priority of CG-PUSCH may be configured by RRC layer signaling;

DS-PUSCH, where the priority of DS-PUSCH may be indicated by the DCI that schedules the PUSCH;

the uplink channel where the resource scheduling request (SR) is located, and the priority of SR may be configured by RRC layer signaling;

PUCCH for hybrid automatic repeat request (HARD) feedback;

where the priority of the PUCCH may be indicated by the DCI that schedules the PUCCH.

In some embodiments, the priorities of various uplink channels may only have two levels, but there may also be three or more levels in the specific implementation.

The padded uplink transmission may be at least one of the following.

It may be pilot, for example, tracking reference signal (TRS)/CSI-RS/demodulation reference signal (DMRS). The frequency-domain position occupied by the pilot may be the same as the frequency-domain position of the channel before or after the time interval. The pilot may occupy all time-domain symbols in the time interval. The filled pilot may be used for accurate channel measurement and estimation, time-frequency synchronization, and the like, which can improve the demodulation performance of uplink data.

It may be repetition of the uplink channel before the time interval. For example, the uplink channel before the time interval is CG-PUSCH, occupying 8 symbols, and the time interval includes 4 symbols. Then 4 certain symbols in the CG-PUSCH may be completely repeated in the time interval. Repeating the uplink transmission on the uplink channel is equivalent to reducing the code rate of the data transmission, so that better data demodulation performance can be obtained.

It may also be repetition of the uplink channel after the time interval. For example, the uplink channel after the time interval is PUCCH for HARQ, occupying 2 symbols, and the time interval is 4 symbols. Then, two uplink transmissions on the PUCCH channel may be completely repeated in the time interval. Repeating the uplink channel is equivalent to reducing the code rate of data transmission, so that better data demodulation performance can be obtained.

Some embodiments of this disclosure provides a communication device, including a processor, a transceiver, a memory, and an executable program stored on the memory and capable of being run by the processor, where the processor is configured to, when executing the executable program, implement the method for sending uplink transmission applied to the UE according to any of the foregoing technical solutions, or the method for receiving uplink transmission applied to the base station according to any of the foregoing technical solutions.

The communication device may be the base station or UE as described above.

The processor may include various types of storage medium, which may be non-transitory computer storage medium that can continue to memorize the information stored thereon after the communication device is power off. Here, the communication device includes a base station or a user equipment.

The processor may be connected to the memory through a bus or the like, for reading the executable program stored in the memory, for example, at least one of the methods shown in FIG. 3 and FIG. 5.

Some embodiments of this disclosure provide a computer storage medium, where an executable program is stored in the computer storage medium. The executable program is used for, when being executed by a processor, implementing the method as described in any technical solution of the first aspect or the second aspect, for example, at least one of the methods shown in FIG. 3 and FIG. 5.

Figure 9:
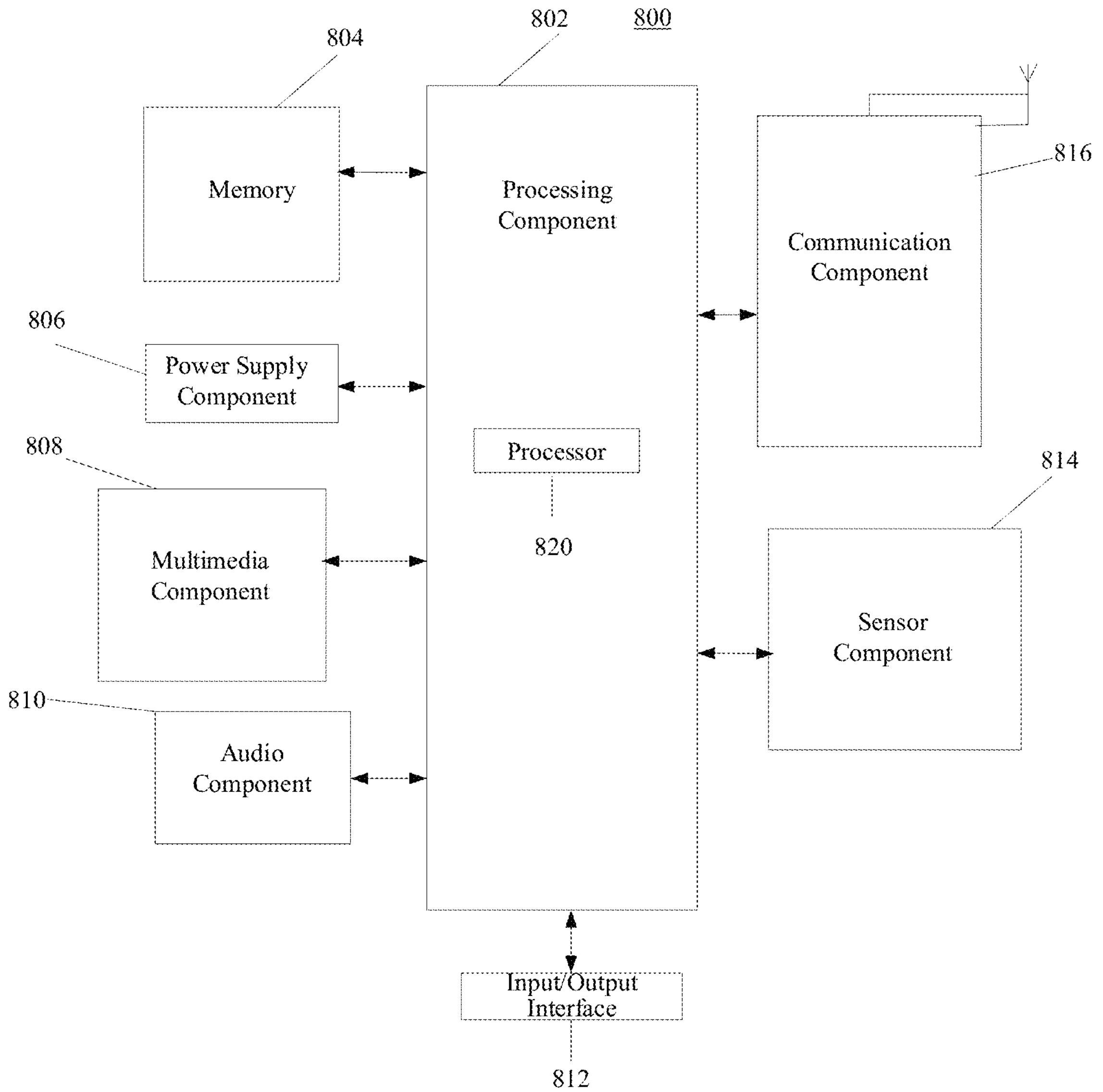
FIG. 9 is a block diagram of a UE according to some embodiments.

FIG. 9 is a block diagram of a UE 800 according to some embodiments. For example, UE 800 may be a mobile phone, computer, digital broadcast user equipment, messaging device, game console, tablet device, medical device, fitness device, personal digital assistant, and the like.

Referring to FIG. 9, UE 800 may include one or more of the following components: processing component 802, memory 804, power supply component 806, multimedia component 808, audio component 810, input/output (I/O) interface 812, sensor component 814, and communication component 816.

Processing component 802 generally controls the overall operations of UE 800, such as operations associated with display, phone calls, data communications, camera operations, and recording operations. Processing component 802 may include one or more processors 820 to perform all or some of the steps of the methods described above by executing instructions. Additionally, processing component 802 may include one or more modules that facilitate interaction between processing component 802 and other components. For example, processing component 802 may include a multimedia module to facilitate interaction between multimedia component 808 and processing component 802.

Memory 804 is configured to store various types of data to support operation at UE 800. Examples of such data include instructions for any application or method operating on the UE 800, contact data, phonebook data, messages, pictures, videos, and the like. Memory 804 may be implemented by any type of volatile or nonvolatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic or optical disk.

Power supply component 806 provides power to various components of UE 800. Power components 806 may include a power management system, one or more power supplies, and other components associated with generating, managing, and distributing power to UE 800.

Multimedia component 808 includes a screen that provides an output interface between UE 800 and the user. In some embodiments, the screen may include a liquid crystal display (LCD) and a touch panel (TP). If the screen includes the touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, multimedia component 808 includes a front camera and/or a rear camera. When UE 800 is in an operation mode, such as a shooting mode or a video mode, the front camera and/or the rear camera may receive external multimedia data. Each of the front and rear cameras may be a fixed optical lens system or have focal length and optical zoom capability.

Audio component 810 is configured to output and/or input audio signals. For example, the audio component 810 includes a microphone (MIC) that is configured to receive external audio signals when the UE 800 is in operating modes, such as calling mode, recording mode, and voice recognition mode. The received audio signal may be further stored in memory 804 or transmitted via communication component 816. In some embodiments, audio component 810 also includes a speaker for outputting audio signals.

I/O interface 812 provides an interface between processing component 802 and a peripheral interface module, which may be a keyboard, a click wheel, a button, or the like. These buttons may include, but are not limited to home button, volume buttons, start button, and lock button.

Sensor component 814 includes one or more sensors for providing various aspects of status assessment for UE 800. For example, sensor component 814 may detect the open/closed state of UE 800, the relative positioning of components, such as the display and keypad of UE 800. Sensor component 814 may also detect the position change of UE 800 or a component of UE 800, presence or absence of user contact on UE 800, orientation or acceleration/deceleration of UE 800, and temperature changes of UE 800. Sensor component 814 may include a proximity sensor configured to detect the presence of nearby objects in the absence of any physical contact. Sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

Communication component 816 is configured to facilitate wired or wireless communications between UE 800 and other devices. UE 800 may access a wireless network based on a communication standard, such as WiFi, 2G or 3G, or a combination thereof. In some exemplary embodiments, communication component 816 receives broadcast signals or broadcast related information from an external broadcast management system via a broadcast channel. In some embodiments, communication component 816 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In some embodiments, UE 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above method.

In some embodiments, there is also provided a non-transitory computer-readable storage medium including instructions, such as a memory 804 including instructions, which are executable by the processor 820 of UE 800 to perform the above method. For example, the non-transitory computer-readable storage medium may be ROM, random access memory (RAM), CD-ROM, magnetic tape, floppy disk, optical data storage device, and the like.

Figure 10:
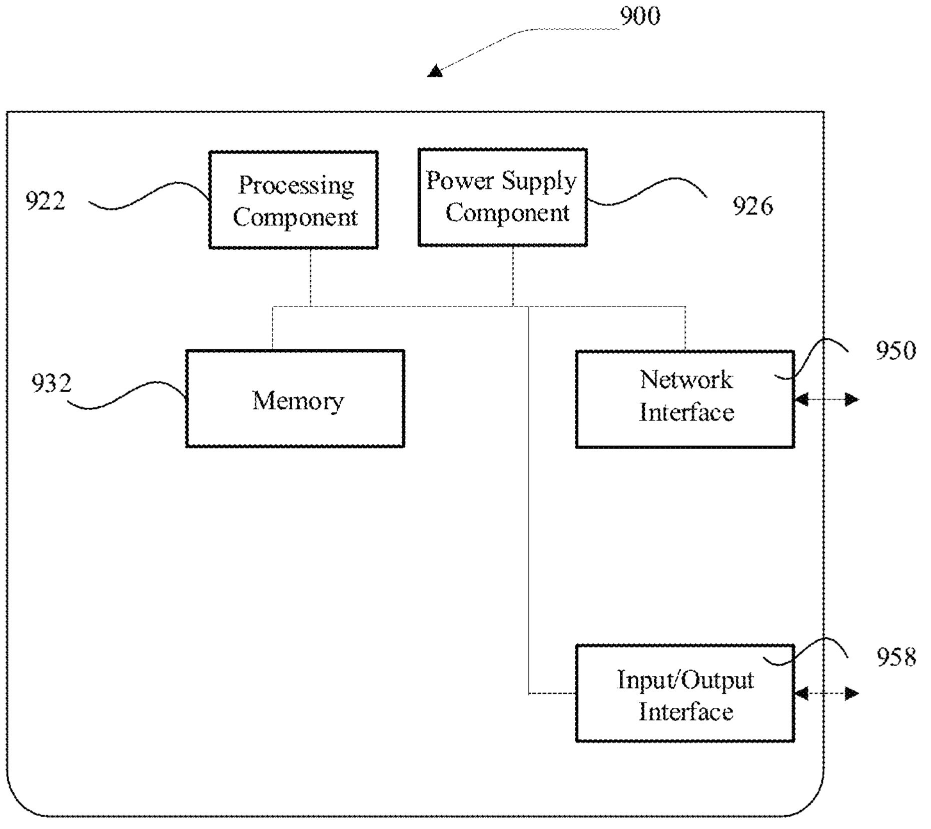
FIG. 10 is a block diagram of a base station according to some embodiments.

As shown in FIG. 10, some embodiments of this disclosure show a structure of a base station. For example, the base station 900 may be provided as a network-side device. Referring to FIG. 10, the base station 900 includes processing component 922, which further includes one or more processors, and a memory resource represented by memory 932 for storing instructions executable by processing component 922, such as application programs. The application programs stored in memory 932 may include one or more modules, each corresponding to a set of instructions. Furthermore, processing component 922 is configured to execute instructions to perform any of the aforementioned methods applied to the base station, for example, the methods shown in FIG. 2-FIG. 3.

The base station 900 may also include a power supply component 926 configured to perform power management of the base station 900, a wired or wireless network interface 950 configured to connect the base station 900 to a network, and an input output (I/O) interface 958. The base station 900 may operate based on an operating system stored in memory 932, such as Windows Server™, Mac OS X™, Unix™, Linux™, FreeBSD™ or the like.

Embodiments of this disclosure provide a method and an apparatus for sending uplink transmission based on unlicensed spectrum, a method and an apparatus for receiving uplink transmission based on unlicensed spectrum, a communication device and medium.

A first aspect of some embodiments of this disclosure provides a method for sending uplink transmission, including:

sending, in response to detecting presence of a time interval within a COT of an unlicensed spectrum, a predetermined uplink transmission within the time interval.

A second aspect of some embodiments of this disclosure provides a method for receiving uplink transmission, including:

receiving, in response to detecting presence of a time interval within a COT of an unlicensed spectrum, a predetermined uplink transmission within the time interval.

A third aspect of some embodiments of this disclosure provides an apparatus for sending uplink transmission, including:

a sending module, configured to send, in response to presence of a time interval within a COT of an unlicensed spectrum, a predetermined uplink transmission within the time interval.

A fourth aspect of the embodiments of this disclosure provides an apparatus for receiving uplink transmission, including:

a receiving module, configured to receive, in response to detecting presence of a time interval within a COT of an unlicensed spectrum, a predetermined uplink transmission within the time interval.

A fifth aspect of the embodiments of this disclosure provides a communication device, including a processor, a transceiver, a memory, and an executable program stored on the memory and executable by the processor, where the processor is configured to, when executing the executable program, implement the method according to any technical solution of the first aspect or the second aspect.

A sixth aspect of the embodiments of this disclosure provides a computer storage medium storing an executable program, where the executable program is used for, when being executed by a processor, implementing the method according to any technical solution of the first aspect or the second aspect.

According to the technical solution provided by the embodiments of this disclosure, when there is a time interval in an occupied COT on the unlicensed spectrum, the UE may automatically send a predetermined uplink transmission to prevent other devices from occupying the transmission channel, where the COT is located, within the time interval when data transmission is stopped, thereby reducing relatively large delay of uplink transmission caused by the channel being interceptionally occupied by other devices and improving the rate of data transmission.

Other embodiments of this disclosure will readily occur to those skilled in the art upon consideration of the specification and practice of the invention disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the following claims.

It is to be understood that this disclosure is not limited to the precise structures described above and illustrated in the accompanying drawings, and that various modifications and changes may be made without departing from the scope thereof. The scope of this disclosure is limited only by the appended claims.

What is claimed is:

1. A method for sending uplink transmission, comprising:

determining an uplink transmission to be transmitted on an uplink channel;

generating a predetermined uplink transmission in response to detecting presence of a time interval within a channel occupancy time (COT) of an unlicensed spectrum, an interval duration of the time interval being less than a threshold value associated with a duration of a fixed frame period (FFP) of the unlicensed spectrum, and at least one uplink channel within the COT after the time interval satisfying at least one of: a time-domain ending position of the uplink channel is located within the COT; or a priority of the uplink channel reaches a preset priority, wherein the predetermined uplink transmission comprises a copy of the uplink transmission;

sending the predetermined uplink transmission within the time interval; and sending the uplink transmission on the uplink channel after expiration of the time interval;

wherein the time interval comprises a gap between time-domain resources of any two adjacent uplink channels within the COT; and wherein the time-domain ending position of the uplink channel located within the COT comprises the time-domain ending position of the uplink channel located at an ending position of the COT.

2. The method according to claim 1, wherein sending the predetermined uplink transmission within the time interval further comprises:

sending a pilot signal within the time interval.

3. A non-transitory computer storage medium storing an executable program, wherein the executable program is used for, when being executed by a processor, implementing the method according to claim 1.

4. The method according to claim 1, wherein the at least one uplink channel is configured with multiple priorities, and the preset priority comprises one or more of the multiple priorities that are higher than remaining of the multiple priorities.

5. A method for receiving uplink transmission, comprising:

receiving a predetermined uplink transmission within a time interval; wherein the predetermined uplink transmission is generated in response to detecting presence of the time interval within a channel occupancy time (COT) of an unlicensed spectrum, an interval duration of the time interval being less than a threshold value associated with a duration of a fixed frame period (FFP) of the unlicensed spectrum, and at least one uplink channel within the COT after the time interval satisfying at least one of: a time-domain ending position of the uplink channel is located within the COT or a priority of the uplink channel reaches a preset priority;

the time interval comprises a gap between time-domain resources of any two adjacent uplink channels within the COT; and the predetermined uplink transmission comprises a copy of an uplink transmission pre-determined to be transmitted on an uplink channel after the time interval; and receiving the uplink transmission pre-determined on the uplink channel after the time interval, wherein the time-domain ending position of the uplink channel located within the COT comprises the time-domain ending position of the uplink channel located at an ending position of the COT.

6. The method according to claim 5, wherein receiving the predetermined uplink transmission within the time interval further comprises:

receiving a pilot signal within the time interval.

7. A communication device, comprising a processor, a transceiver, a memory, and an executable program stored on the memory and executable by the processor, wherein the processor is configured to, when executing the executable program, implement the method according to claim 5.

8. A non-transitory computer storage medium storing an executable program, wherein the executable program is used for, when being executed by a processor, implementing the method according to claim 5.

9. The method according to claim 5, wherein the at least one uplink channel is configured with multiple priorities, and the preset priority comprises one or more of the multiple priorities that are higher than remaining of the multiple priorities.

10. A communication device, comprising a processor, a transceiver, a memory, and an executable program stored on the memory and executable by the processor, wherein the processor is configured to, when executing the executable program, determine an uplink transmission to be transmitted on an uplink channel;

generate a predetermined uplink transmission in response to detecting presence of a time interval within a channel occupancy time (COT) of an unlicensed spectrum, an interval duration of the time interval being less than a threshold value associated with a duration of a fixed frame period (FFP) of the unlicensed spectrum, and at least one uplink channel within the COT after the time interval satisfying at least one of: a time-domain ending position of the uplink channel is located within the COT or a priority of the uplink channel reaches a preset priority;

wherein the predetermined uplink transmission comprises a copy of the uplink transmission;

send the predetermined uplink transmission within the time interval; and send the uplink transmission on the uplink channel after the time interval;

wherein the time interval comprises a gap between time-domain resources of any two adjacent uplink channels within the COT; and wherein the time-domain ending position of the uplink channel located within the COT comprises the time-domain ending position of the uplink channel located at an ending position of the COT.

11. The communication device according to claim 10, wherein the processor is further configured to send a pilot signal within the time interval.

12. The communication device according to claim 10, wherein the at least one uplink channel is configured with multiple priorities, and the preset priority comprises one or more of the multiple priorities that are higher than remaining of the multiple priorities.

* * * * *